United States Patent [19]

Beach et al.

[11] 4,311,467
[45] Jan. 19, 1982

[54] ASSEMBLY FOR PAIRED FACE TO FACE DENTAL TRAINEES

[75] Inventors: Daryl R. Beach, Atami; Kazuo Hayashi, Yawata, both of Japan

[73] Assignee: Kabushiki Kaisha Morita Seisakusho, Kyoto, Japan

[21] Appl. No.: 171,646

[22] Filed: Jul. 23, 1980

[30] Foreign Application Priority Data

Jul. 30, 1979 [JP] Japan .......................... 54-105647[U]

[51] Int. Cl.³ ............................................. G09B 23/28
[52] U.S. Cl. ................................................... 434/264
[58] Field of Search ................... 434/263, 264; 433/77, 433/78, 79, 229

[56] References Cited

U.S. PATENT DOCUMENTS

| | | | |
|---|---|---|---|
| 451,061 | 4/1891 | Magnusson | 434/264 |
| 3,497,955 | 3/1970 | Gallagher | 434/263 |
| 3,690,008 | 9/1972 | Tuttle et al. | 434/263 |
| 3,936,936 | 2/1976 | Knudson | 433/77 |
| 3,949,480 | 4/1976 | Page | 433/78 X |
| 4,095,379 | 6/1978 | Weintraub | 433/77 X |
| 4,209,908 | 7/1980 | Fleer | 433/78 |

Primary Examiner—William H. Grieb
Attorney, Agent, or Firm—Koda and Androlia

[57] ABSTRACT

This disclosure relates to an assembly for paired face to face dental trainees designed to permit two trainees to receive training in dental treatment by seating them in an opposed relation with each other with the desk placed therebetween. The assembly is greatly contributable to a reduction in space, cost in that it comprises human head models and freely drawable and retractable instruments symmetrically mounted in the front and rear side of the desk assembly, drawing and retraction devices for the instruments housed in the upper and lower layers in the desk, a control unit and a piping unit each for a supply fluid housed in the desk, and side boxes attached to the same side on the front and the rear side of the desk and adapted to store treatment tools, utensils and the like therein.

5 Claims, 8 Drawing Figures

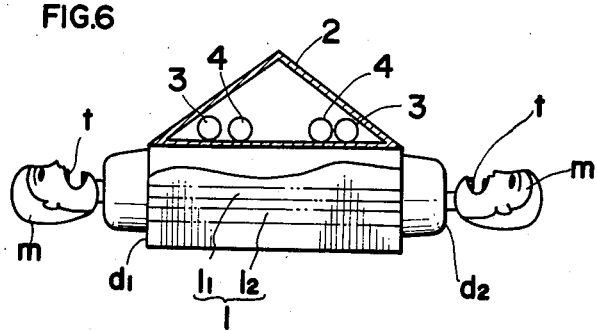
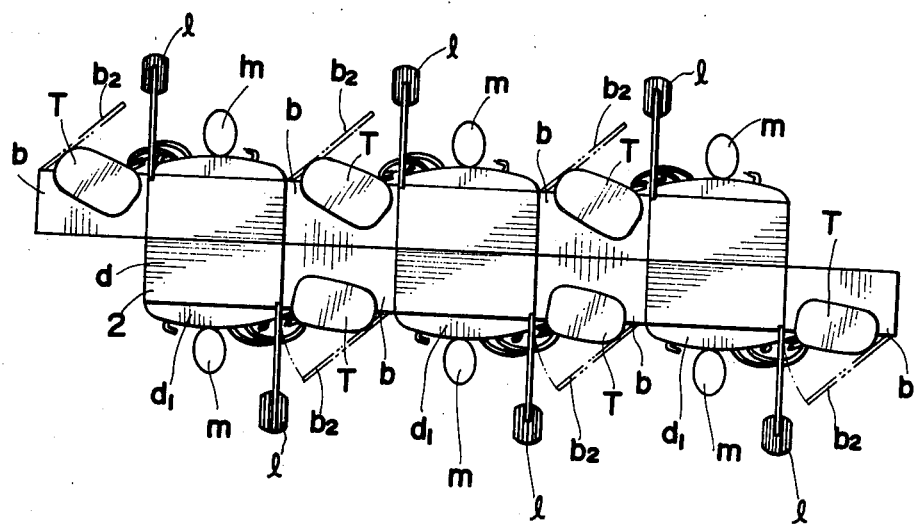

ASSEMBLY FOR PAIRED FACE TO FACE DENTAL TRAINEES

BACKGROUND OF THE INVENTION

1. Field of the Invention

This invention relates to an assembly for paired face to face dental trainees who undergo training in dental treatment. In recent years the number of dental trainees who secure such training shows a yearly upward trend, while on the other hand, the space cost of a practice room for the training is also increasing. In view of this fact, there is an increasing demand for training and instruction of a large number of students by reasonable use of space.

2. Prior Art

Referring now to a conventional dental practice desk assembly and also to drawbacks thereof with reference to a perspective view of FIG. 8, the conventional practice desk assembly d is allotted per one trainee and is detachably equipped on the front side $d_1$ thereof with various instruments i . . . and is protrudently equipped at the center with a human head model m so as to permit the free opening and closing of the jaws t thereof. Ducts for air, water, etc. supplied to each of the instruments i . . . are led into the desk assembly through branch pipes s from a main duct (not shown) laid in the floor f and are connected inside the desk assembly to flexible pipes h . . . connected to each instrument i . . . . The flexible pipes h are adapted to freely draw and retract each instrument i . . . over a desired length by a drawing and retraction device (not shown).

A box b on the right side of the desk assembly d is adapted to keep other instruments, models, etc. used in practice dental treatment therein and the character l designates a lamp.

As apparent from the above, the conventional desk assembly is intended for a single trainee's use, and accordingly if the desks are arranged in line by units each consisting, in parallel combination, of a desk d and a side box b, it requires considerable space in the direction of a line to hold a large number of trainees, with the result that an increase in the cost of space required is inevitable. Furthermore, work for supply of pipes (branch pipes s . . .) from under the floor to the desk not only increases the cost of work, but work for repair is also cumbersome and high in cost.

SUMMARY OF THE INVENTION

This invention is directed to a solution of the problems described above. The first step of solution to the problems is to reduce the number of desks by half by disposing one desk between two trainees facing each other; the second step is to arrange instruments symmetrically on each front side of the same desk between two trainees facing the same desk and to lay flexible pipe drawing and retracting devices in the desk assembly one above the other in two layers so as to check an increase in the size of the depth by preventing spread of horizontal space by utilizing the upper and lower layers of spaces; the third step is to dispose a box on the top surface of each desk so as to store a control unit and a piping unit both for fluid such as air, water, etc. (the box is of a triangular pillar shape in a preferred form in consideration of its outer appearance and of reduction in the space occupied by the box) and to solve the problems caused by the under-floor piping system by laying the main duct not under the floor but on the floor to supply fluid to each box from the main duct; and the fourth step of the solution is to dispose a side box separate from the desk laterally of the same side on the front and rear sides of the desk and (preferably, when two desks are placed adjacent to each other, the side boxes are longitudinally placed flush with each other on the front and the rear side of the desk) each side box is formed integrally with the desk by projecting the box from one side of the desk so as not to produce waste space between the two desks arranged in a side-by-side relation in line.

A detailed description will be given of the present invention with reference to the accompanying drawings.

BRIEF DESCRIPTION OF THE DRAWINGS

FIG. 6 is an enlarged sectional view taken along the line B—B of FIG. 2;

FIG. 7 is a plan view showing a layout of the desk assembly according to the present invention.

Figure 1:
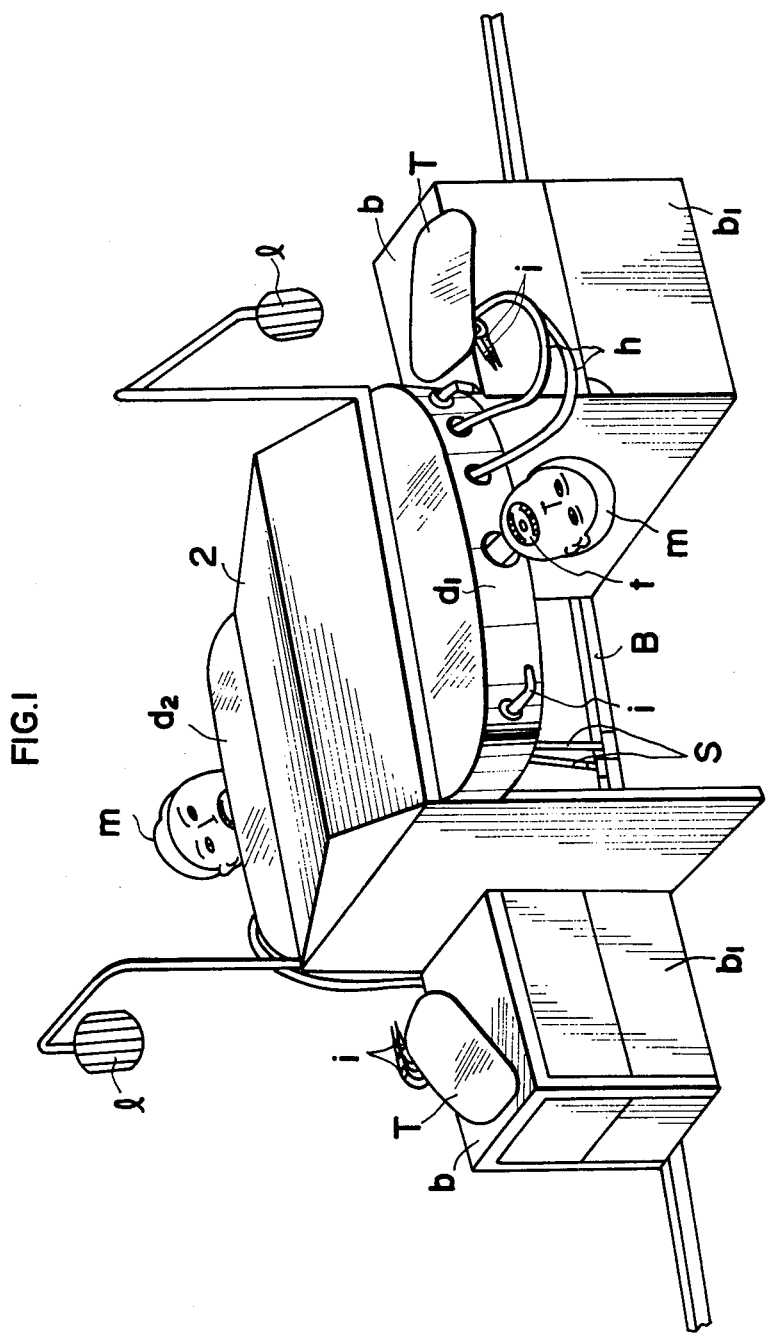
FIG. 1 is a perspective view of the assembly for paired face to face dental trainees, according to the present invention.
Figure 2:
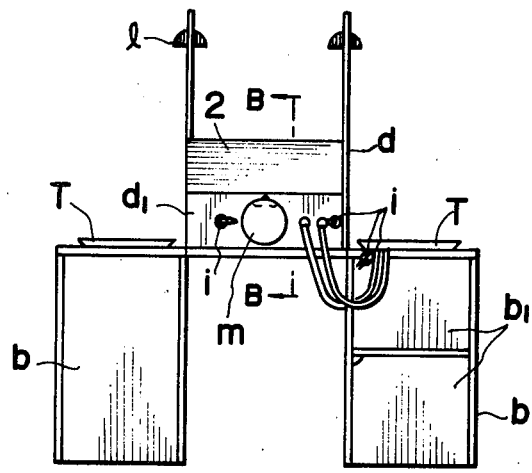
FIG. 2 is a front view of FIG. 1.
Figure 3:
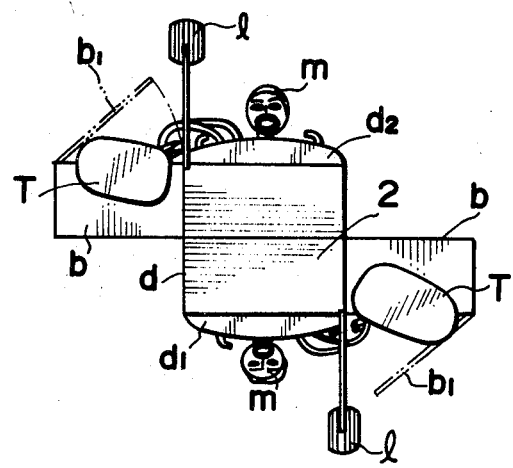
FIG. 3 is a plan view of FIG. 1.
Figure 4:
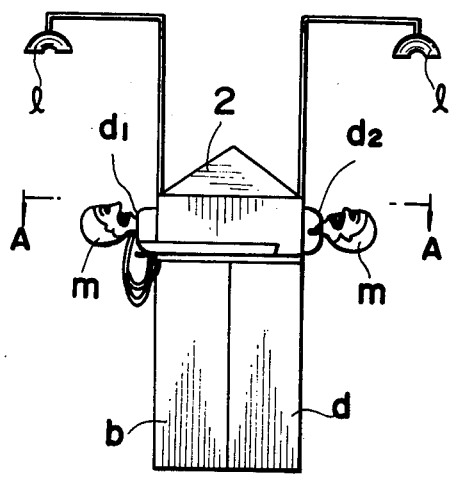
FIG. 4 is a side view of FIG. 1.
Figure 5:
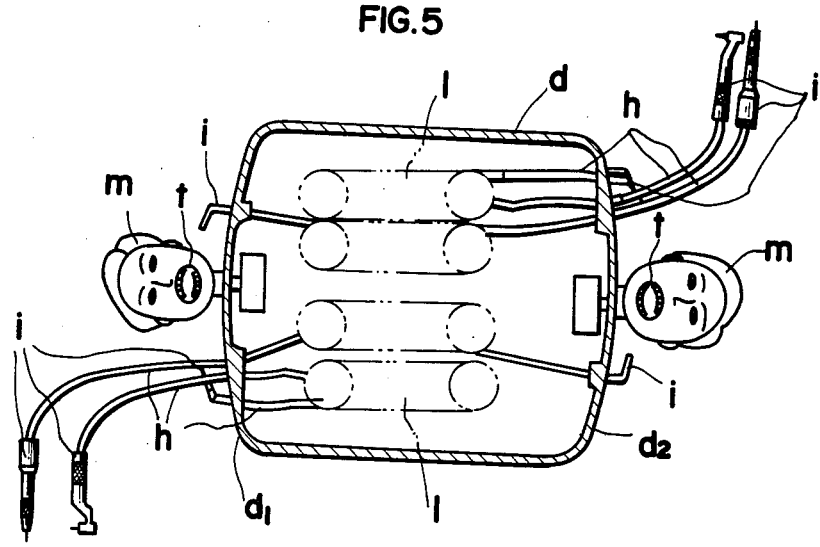
FIG. 5 is an enlarged sectional view taken along the line A—A of FIG. 4.
Figure 8:
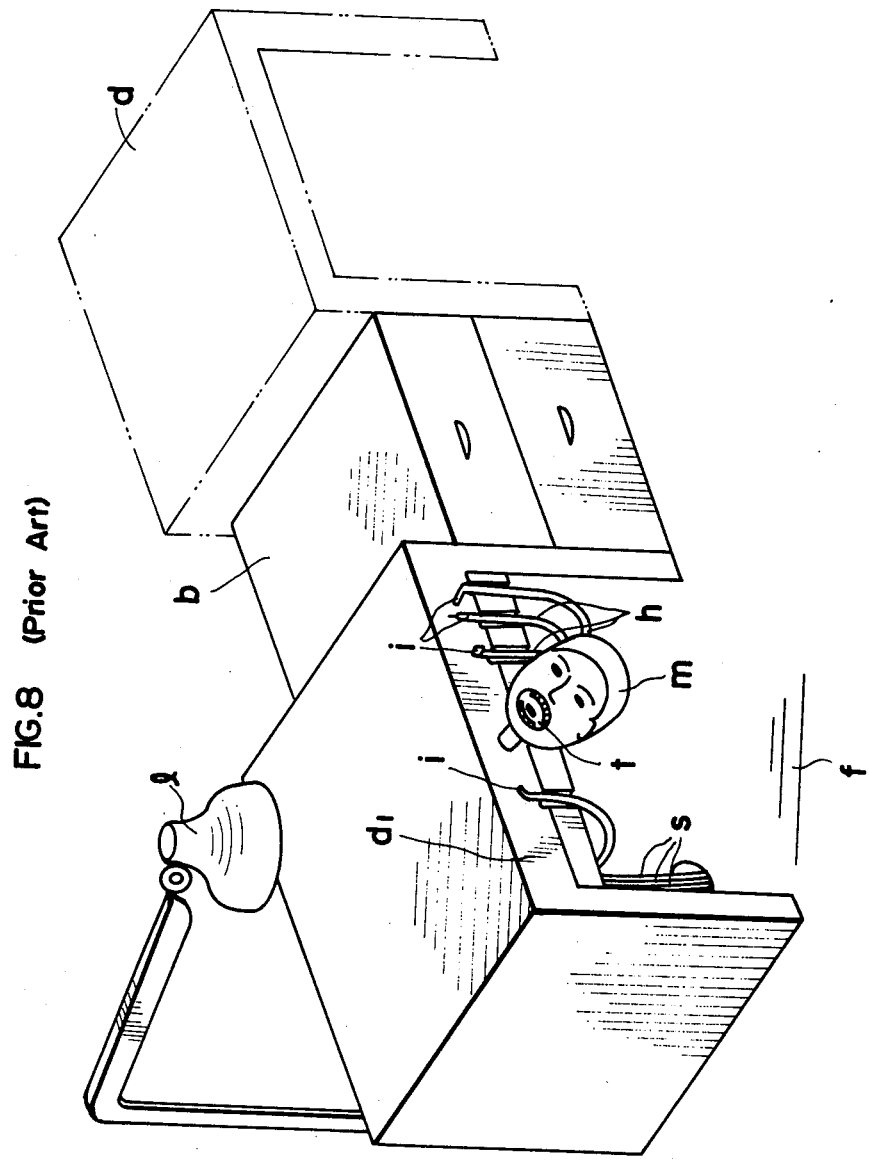
FIG. 8 is a perspective view of a prior art assembly.

For convenience of description, the reference characters for the members and portions of the conventional desk assembly are used throughout the invention to represent similar members and portions.

DETAILED DESCRIPTION OF THE INVENTION

According to the assembly for paired face to face dental trainees in the embodiment of the invention, a human head model m having freely openable jaws t in substantially the center of the front side $d_1$ and rear side $d_2$ of a symmetrically formed front and rear integral desk assembly is projectingly provided in substantially the center of the desk on the front side $d_1$ and rear side $d_2$ and necessary instruments i . . . are mounted together with flexible connection pipes h . . . bilaterally of the head model m so as to permit free drawing and retraction of the instruments and to bring them into the same position relation with each other with respect to the head model m both on the front side $d_1$ and the rear side $d_2$. The drawing and retraction device 1 is divided into a device for front side use $1_1$ and that for rear side use $1_2$, the devices for front and rear side uses $1_1$ and $1_2$ are laid one over the other (FIG. 6) and a box 2 for storing therein connection units 3, 3 for connecting feed pipes s . . . respectively to the front side device $1_1$ and control units 4, 4 for supply liquid is placed on the desk. And since boxes b, b are mounted on the same side on the front and rear sides of the desk in such a manner as the boxes may project from the same side of the desk. Also, trays T, T are placed on the side boxes b, b and the feed pipes from the main duct B laid on the floor.

In the embodiment illustrated, the box 2 is indicated as a triangular columnar box, and since the top edge portion of the box is designed to be positioned approximately in the center (on the median line) of the desk surface, the space occupied by the desk can be reduced with a good appearance. Also, the drawing and retraction device 1 in FIG. 6 is shown as the one in the upper layer being for use as a front side drawing and retraction device $1_1$ and the one in the lower layer being for use as a rear side drawing and retraction device $1_2$, and it should be readily understood that the reverse is also possible. Arrangement of side boxes b, b is contemplated so that when two desks d, d are placed adjacent to each other as shown in FIG. 7, the respective front and rear sides of the side boxes b, b are aligned flush with the respective front side $d_1$ and rear side $d_2$ of desks d, d. This is intended to prevent the boxes, b, b from being irregularly positioned and thereby losing smartness in appearance and working, and to reduce the space occupied by the desks. But it is not essential to align the boxes in the form illustrated in the embodiment.

The side box b is provided with a door $b_1$ so as to permit its opening and closing by reaching out a hand to the side of the desk d. The main duct B is laid on the floor and connected to connections 3, 3 through feed pipes s . . . from right below the box 2.

As described above, when compared with the conventional desk assembly in which desks were merely placed in an opposed relation, the invention is significantly characterized in that the space occupied in the direction of depth which is necessary for the feet of two trainees is reduced by permitting two trainees to sit in an opposed position with each other with one table placed therebetween and laying the drawing and traction devices for flexible tubes for instruments one over the other by disposing on the desk the control unit and piping unit which were heretofore disposed under the desk.

A description will now be given of the way of arranging the assembly for paired face to face dental trainees and of advantages of the desk assembly of the present invention with reference to FIG. 7. As apparent from the Figure, side boxes protruding from the desks d, d are longitudinally placed in abutment between the adjacent desk d-d so as to save space between the adjacent desks (the boxes b, b illustrated are placed so as to be aligned with the front side $d_1$ and the rear side $d_2$). Furthermore, when the desks of the invention are arranged parallelly in the direction of depth (not shown), comparison of the desk assembly of the invention with the conventional desk assembly in which practice desks are merely arranged in an opposed relation makes it clear that the present invention enables instruction of a larger number of trainees by reducing the space occupied by the desk assemblies in the direction of depth and increasing holding capacity by reasonable use of space within the same space. And since the liquid is supplied by feed pipes s . . . to the connections 3 . . . of each desk assembly d from the main duct B laid on the floor, the invention makes connection work and maintenance work far easier than the conventional desk assembly in which connection has to be made to the main duct under the floor. Furthermore, since the drawing and retraction devices 1 each for flexible pipes are provided respectively in upper and lower layers inside the desk assembly, horizontal spread of the desk assembly d can be reduced and made more compact than the case wherein two devices 1 are arranged parallelly in horizontal space.

From the advantages described above, this invention is significantly useful in the instruction of trainees in dental treatment when voices for more reasonable space utilization are raised and when there is an upward tendency of the trainees to increase in number.

We claim:

1. An assembly for paired face to face dental trainees comprising a longitudinally symmetrically combined desk capable of seating two trainees in a longitudinally opposed relation with each other, instruments freely drawable and retractable with flexible connection pipes from and into each end face on the front and rear sides of said desk, human head models including the jaws and protrudently mounted in said each end face, instrument drawing and retraction devices housed in layers inside said each front and rear side desk, storing boxes each provided on said each front and rear side desk, a control unit and a piping unit each for a fluid supply such as air, water and the like housed in each of said storing boxes, and side boxes mounted symmetrically integrally to the same side on each front and rear side of said desk.

2. An assembly according to claim 1, wherein said side boxes are brought into abutment with each other with no space longitudinally left therebetween when a plurality of said desk assemblies are arranged in a side-by-side relation.

3. An assembly according to claim 2, wherein the front and the rear side of each of said longitudinally adjacent side boxes are aligned flush with the front and the rear side of said laterally adjacent desk assemblies.

4. An assembly according to claim 2, or 3, wherein a tray is placed on each of said side boxes and said instruments are adapted to be retained in the state of their being drawn out.

5. An assembly according to claim 1, wherein said control unit and said piping unit each for a supply liquid are connected by feed pipes divergently from one main duct laid on the floor.

* * * * *